(12) United States Patent
Takada et al.

(10) Patent No.: US 8,204,144 B2
(45) Date of Patent: Jun. 19, 2012

(54) WIRELESS COMMUNICATION SYSTEM, APPARATUS AND METHOD THEREOF

(75) Inventors: May Takada, Koganei (JP); Satoshi Tamaki, Kokubunji (JP); Shigeyuki Ejiri, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 420 days.

(21) Appl. No.: 12/483,370

(22) Filed: Jun. 12, 2009

(65) Prior Publication Data

US 2010/0027595 A1 Feb. 4, 2010

(30) Foreign Application Priority Data

Jul. 30, 2008 (JP) .................................. 2008-196873

(51) Int. Cl.
*H04B 7/02* (2006.01)
*H04L 1/02* (2006.01)

(52) U.S. Cl. .................... 375/267; 375/259; 375/260
(58) Field of Classification Search .................... 375/267
See application file for complete search history.

(56) References Cited

U.S. PATENT DOCUMENTS

| | | | |
|---|---|---|---|
| 2008/0212701 A1* | 9/2008 | Pan et al. ...................... | 375/260 |
| 2008/0232449 A1* | 9/2008 | Khan et al. .................... | 375/220 |
| 2008/0298433 A1* | 12/2008 | Tiirola et al. ................. | 375/132 |
| 2008/0313521 A1* | 12/2008 | Frederiksen et al. ......... | 714/748 |
| 2009/0147744 A1* | 6/2009 | Dottling et al. ............... | 370/329 |
| 2009/0291699 A1* | 11/2009 | Heath et al. ................... | 455/501 |
| 2010/0074229 A1* | 3/2010 | Seki .............................. | 370/335 |

FOREIGN PATENT DOCUMENTS

JP 2006-229635 8/2006

* cited by examiner

*Primary Examiner* — David C. Payne
*Assistant Examiner* — Erin File
(74) *Attorney, Agent, or Firm* — Antonelli, Terry, Stout & Kraus, LLP.

(57) ABSTRACT

Provided is a wireless communication system, comprising: a wireless communication apparatus which performs adaptive modulation for changing a modulation method and an encoding rate of a data channel, and transmits/receives a signal via MIMO multiplexing. The control information comprises first control information to be used for a MIMO stream separation process and second control information not to be used for the MIMO stream separation process. The selections in the second control information are changed corresponding to selected first control information. The wireless communication apparatus determines the first control information at an update timing of the first control information by referring to the first control information table, determine selections of the second control information based on the determined first control information, and select one of the selections of the second control information among the determined selections of the second control information at an update timing of the second control information.

14 Claims, 8 Drawing Sheets

WIRELESS COMMUNICATION SYSTEM, APPARATUS AND METHOD THEREOF

CLAIM OF PRIORITY

The present application claims priority from Japanese patent application JP 2008-196873 filed on Jul. 30, 2008, the content of which is hereby incorporated by reference into this application.

BACKGROUND OF THE INVENTION

This invention relates to a wireless communication system, and more particularly to a wireless communication system that includes a combination of an adaptive modulation scheme and a MIMO multiplexing scheme.

Recent cellular wireless communication system such as a cellular phone is required to transmit a variety of data from information consisting of a relatively small number of bits, such as voice/character mail, to information consisting of a large number of bits, such as mail with pictures attached, and video phone calls. To meet these requirements, in the cellular wireless communication system, a plurality of packet sizes and a plurality of modulation schemes corresponding to the amount of data (number of bits) to be transmitted are available. The system appropriately chooses a combination of the packet size and the modulation scheme according to the wireless propagation environment during the transmission, thereby improving the transmission efficiency. A system that adopts to a changing wireless propagation environment and selects the most appropriate modulation scheme to improve transmission efficiency is called an adaptive modulation scheme. This adaptive modulation technique is employed in the current third-generation cellular phone system standard.

For the next-generation cellular phone standard, to increase the transmission capacity within an allocated frequency band, a multiple input multiple output (MIMO) system that spatially multiplexes signals simultaneously on the same frequency by a plurality of antennas of a transmitter/receiver is being introduced. In a wireless communication system that employs the MIMO system, a transmitter simultaneously transmits different data streams from a plurality of transmitter antennas. A receiver receives the transmitted data using a plurality of receiver antennas, and separates the MIMO-multiplexed signal into the original data streams, and then demodulate them. The employment of the MIMO system increases the transmission capacity of data transmission/reception in an wireless communication system. Theoretically, effect of increasing the transmission capacity equals to doubling of a bandwidth when two antennas are provided, and tripling of a bandwidth when three antennas are provided.

In the adaptive modulation scheme, the transmitter side selects a packet size and a modulation scheme appropriate to the wireless propagation environment, encodes a data packet to be transmitted, and modulates the data packet by the selected scheme. The transmitter side sends the parameters used for the modulation together with the data. The parameters include, for example, a modulation scheme, an encoding rate, and a packet size. These parameters are called a modulation and coding scheme (MCS). The receiver side requires this MCS information for demodulating the data.

In the system that employs the adaptive modulation, data is transmitted through a data channel, and control information such as MCS information is transmitted through a control channel. The receiver side is incapable of demodulating the data channel unless it can determine which of the modulation schemes has modulated the transmitted data. Thus, the receiver side performs processing in order of first demodulating the control channel containing the control information, extracting the MCS information, and then demodulating the data channel.

For this reason, the receiver side has to secure a memory capacity large enough to temporarily store the data of the data channel before demodulation, until the demodulation of the control channel is completed. Further, it takes time to demodulate the control channel. The problem of delay in processing the data channel is further increased.

This problem has been pointed out in JP 2006-229635 A, which discloses a technique related to a baseband demodulation architecture suitable for the adaptive modulation scheme. However, in the system which employs the adaptive modulation scheme performs MIMO multiplexing, a MIMO stream separation process has to be carried out at a stage prior to demodulation of the data channel. Thus, the problems become greater.

Introduction of the MIMO system to the wireless communication system based on the adaptive modulation scheme necessitates the receiver to carry out MIMO stream separation in addition to normal data channel demodulation. Thus, when the MIMO system is employed for the adaptive modulation scheme, as compared with a case where only the adaptive modulation scheme is employed, processing steps of the data channel further increases, resulting in a much greater delay.

A large processing delay of the data channel causes a reduction in quality of real-time communication services such as voice (VoIP) or TV telephone. A cycle of closed-loop feedback control such as hybrid automatic repeat request (H-ARQ) is made longer, causing a reduction in transmission capacity.

This invention provides a wireless communication system for a MIMO adaptive modulation scheme, which can reduce a memory capacity for storing data before demodulation and suppress a processing delay of a data channel.

SUMMARY OF THE INVENTION

A representative aspect of this invention is as follows. That is, there is provided a wireless communication system, comprising: a wireless communication apparatus which performs adaptive modulation for changing a modulation method and an encoding rate of a data channel by using the data channel and a control channel for transmitting control information to be applied to the data channel, and transmits/receives a signal via MIMO multiplexing. The control information comprises first control information to be used for a MIMO stream separation process and second control information not to be used for the MIMO stream separation process. The wireless communication apparatus holds a first control information table describing selections of the first control information and a second control information table describing selections of the second control information The selections in the second control information table are changed corresponding to first control information selected in the first control information table. The wireless communication apparatus determines the first control information at an update timing of the first control information by referring to the first control information table, determine selections of the second control information based on the determined first control information, and select one of the selections of the second control information among the determined selections of the second control information at an update timing of the second control information.

According to an embodiment of this invention, it is possible to curb a delay in data demodulation processing and to reduce a memory capacity for storing data to be demodulated.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

Referring to FIGS. 1 to 8, a preferred embodiment of this invention will be described.

Figure 1:
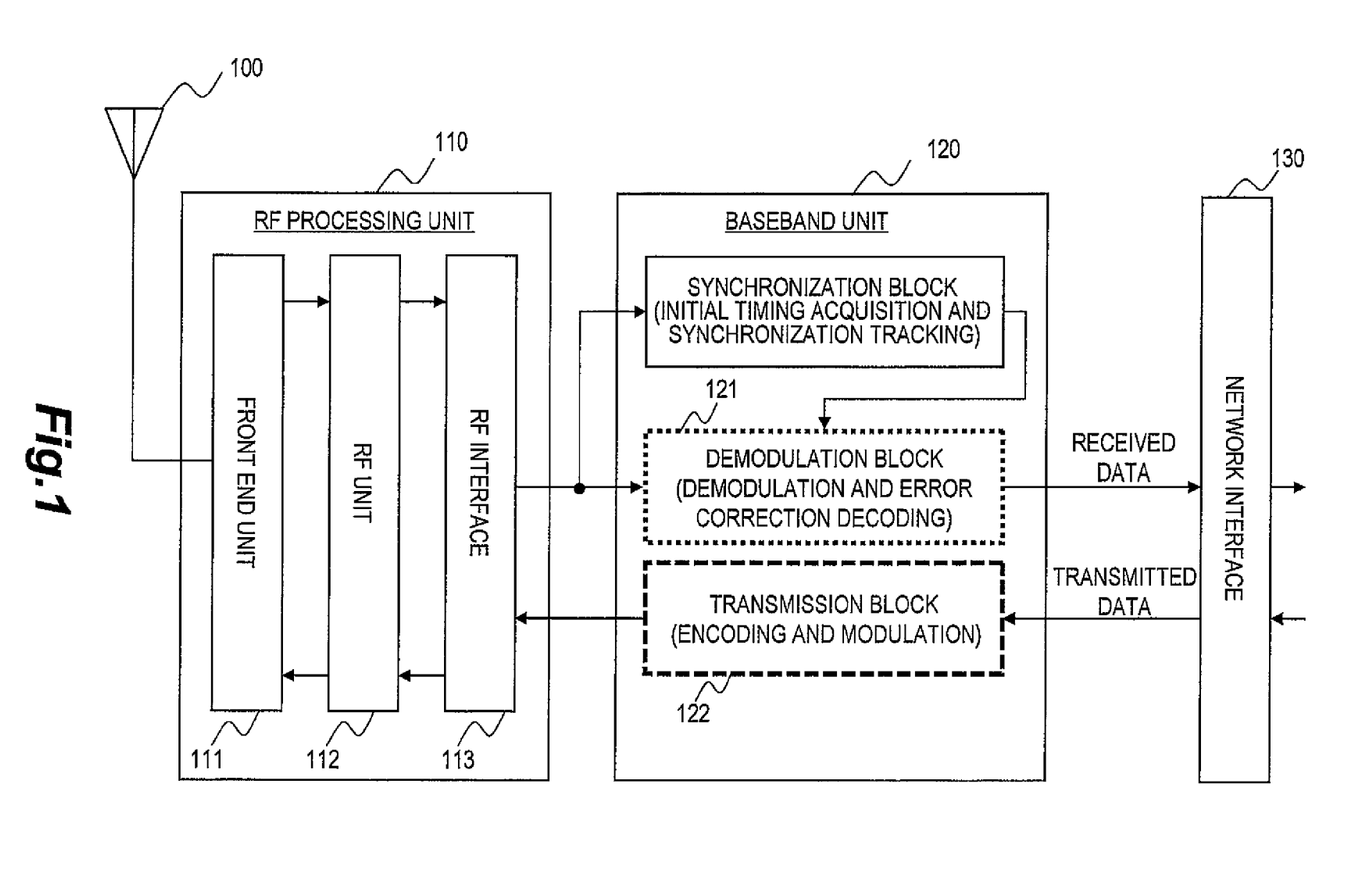
FIG. 1 is a block diagram illustrating a configuration of a base station in a wireless communication system in accordance with an embodiment of this invention.

FIG. 1 is a block diagram illustrating a configuration of a base station in a wireless communication system according to an embodiment of this invention.

The base station of the embodiment includes an antenna 100, a RF (Radio Frequency) processing unit 110, a baseband unit 120, and a network interface 130.

The RF (Radio Frequency) processing unit 110 performs signal processing of a wireless level, and includes a front end unit 111, a RF unit 112, and a RF interface 113. The baseband unit 120 includes a demodulation block 121 for processing a baseband signal in a physical layer and decoding the received signal or correcting an error thereof, a transmission block 122 for encoding and modulating a signal to be transmitted, and a synchronization block. The network interface 130 transmits and receives data to and from other base station via a network.

A configuration of a terminal apparatus is similar to that of the base station illustrated in FIG. 1. However, the terminal apparatus does not include the network interface 130.

Next, data transmission/reception of the base station will be described.

A signal received by the antenna 100 is separated into a path of the received signal by an antenna switch (or duplexer) in the front end unit 111 to be filtered. The separated received signal is converted into a frequency of a baseband by the RF unit 112. The received signal converted into the frequency is further converted into a digital signal by the RF interface 113, demodulated by the demodulation block 121 after acquisition of a synchronous signal at the synchronization block of the baseband unit 120, and transmitted to the network via the network interface 130.

A signal to be transmitted to the terminal apparatus is input from the network interface 130 to the transmission block 122 of the baseband unit 120, and subjected to modulation processing such as addition of an error correction code or encoding. Then, the transmission signal is converted into an analog signal by the RF interface 113 to become a signal of a predetermined frequency band at the RF unit 112, and filtered by the front end unit 111 to be transmitted from the antenna 100.

This invention particularly relates, for example, to a configuration of the demodulation block 121 and the transmission block 122 of the baseband unit.

Figure 2:
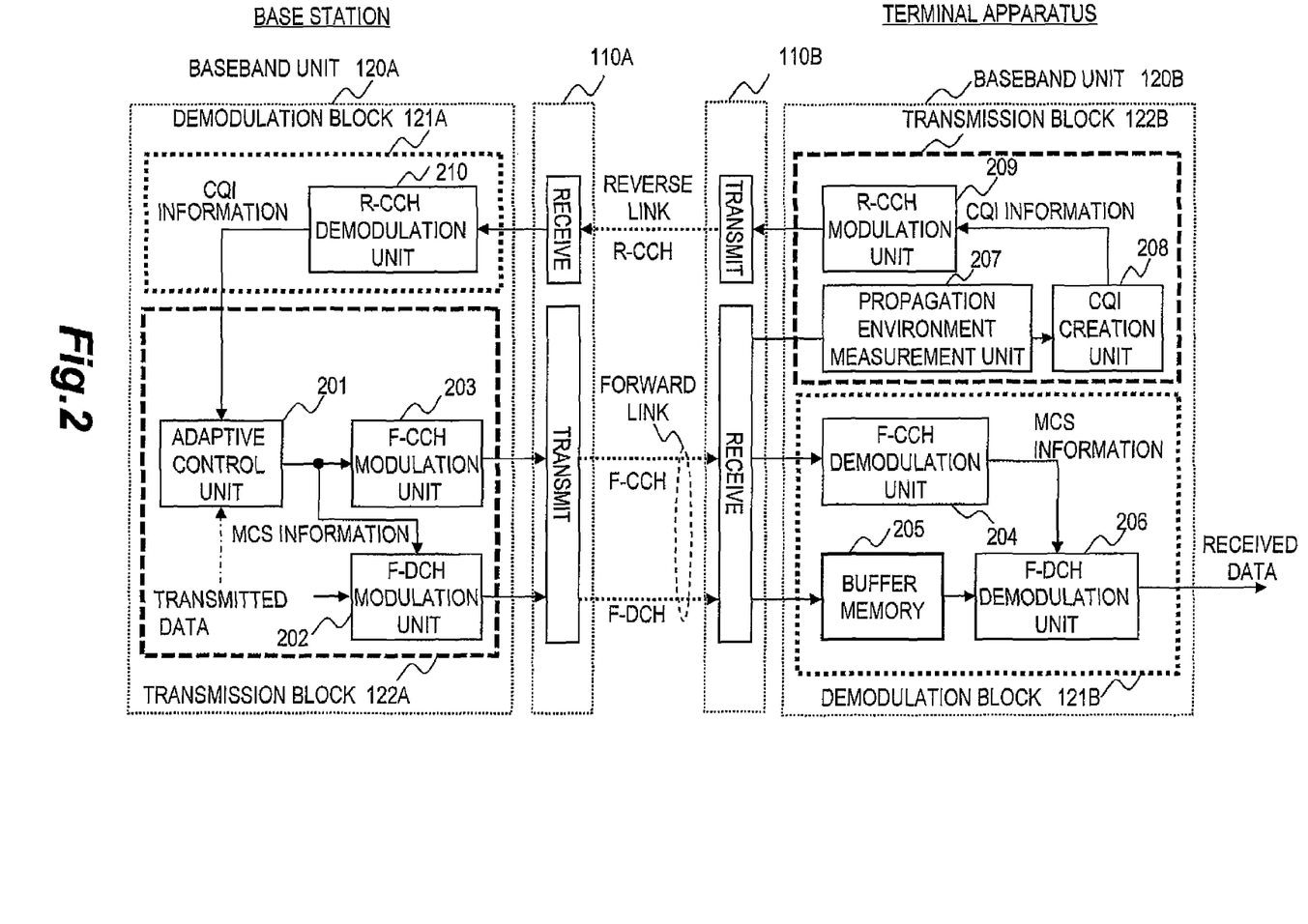
FIG. 2 is a block diagram illustrating a feedback control operation in a case of performing adaptive modulation in accordance with the embodiment of this invention.

FIG. 2 is a block diagram illustrating a feedback control operation in a case of performing adaptive modulation according to the embodiment of this invention.

Referring to FIG. 2, a feedback control operation when adaptive modulation is applied to a forward link from the base station to the terminal apparatus, in other words, when the base station side performs adaptive modulation to transmit data to the terminal apparatus, will be described. The feedback control operation is similar in the case of a reverse link. Thus, transmitted signals in both reverse and forward links can be adaptively modulated. When the terminal apparatus performs feedback control of adaptive modulation in the reverse link, in FIG. 2, "base station" may be interpreted as "terminal apparatus" and "terminal apparatus" may be interpreted as "base station", or "REVERSE LINK" may be interpreted as "forward link" and "forward link" may be interpreted as "reverse link".

The transmission block 122A of the baseband unit 120A of the base station determines, by an adaptive control unit 201, MCS information to be applied to a forward data channel, and encodes, by a forward data channel (F-DCH) modulation unit 202, data of the forward data channel to be transmitted based on the MCS information. A forward control channel (F-CCH) modulation unit 203 encodes the MCS information, and provides the encoded MCS information so as to be included in a forward control channel. The data and the MCS information is assigned different frequency resources (time, frequency, or code (in the case of code multiplexing)) to be transmitted.

Next, operations performed on the terminal apparatus side to receive and demodulate data and to determine quality of a received signal will be described.

In the demodulation block 121B of the baseband unit 120B of the terminal apparatus, received signals are separated into a forward control channel signal and a forward data channel signal, and received data of the forward data channel is temporarily stored in a buffer memory 205. During this period, the forward control channel signal is demodulated by a forward control channel (F-CCH) demodulation unit 204 and MCS information is extracted therefrom. The extracted MCS information is input to a forward data channel (F-DCH) demodulation unit 206. The F-DCH demodulation unit 206 reads out the received signal from the buffer memory 205 to demodulate the forward data channel based on the extracted MCS information.

A propagation environment measurement unit 207 of the transmission block 122B of the terminal apparatus side baseband unit 120B obtains a numerical value such as a signal-to-noise ratio (SINR) that becomes an indicator of a propagation environment, and inputs its result to a CQI creation unit 208. The CQI creation unit 208 creates a CQI based on the environment indicator value thus input. The channel quality indicator (CQI) refers to channel quality information. A reverse control channel (R-CCH) modulation unit 209 encodes the CQI information, provides the encoded CQI information so as to be included in a reverse control channel, and transmits the information.

Next, an operation performed by the base station to receive a signal, determine an appropriate modulation scheme based on received CQI information, and then transmit MCS information to the terminal apparatus will be described.

The demodulation block 121A of the baseband unit 120A on the base station side demodulates a reverse control channel by an R-CCH demodulation unit 210, extracts CQI information, and inputs the extracted CQI information to an adaptive control unit 201 of the transmission block 122A. The adaptive control unit 201 evaluates the CQI information, a transmitted data amount of the forward data channel, and quality of service (QoS) to select an optimal modulation scheme at the present moment, and determines MCS information to be contained in next transmitted data. The QoS refers to communication quality required from an application. Thereafter, an operation performed by the base station to transmit forward data is similar to the aforementioned operation, and feedback control is repeatedly performed.

Next, an example of a data demodulation operation performed by the baseband unit when MIMO multiplexing is introduced to an OFDM system that performs adaptive modulation will be described.

Figure 3:
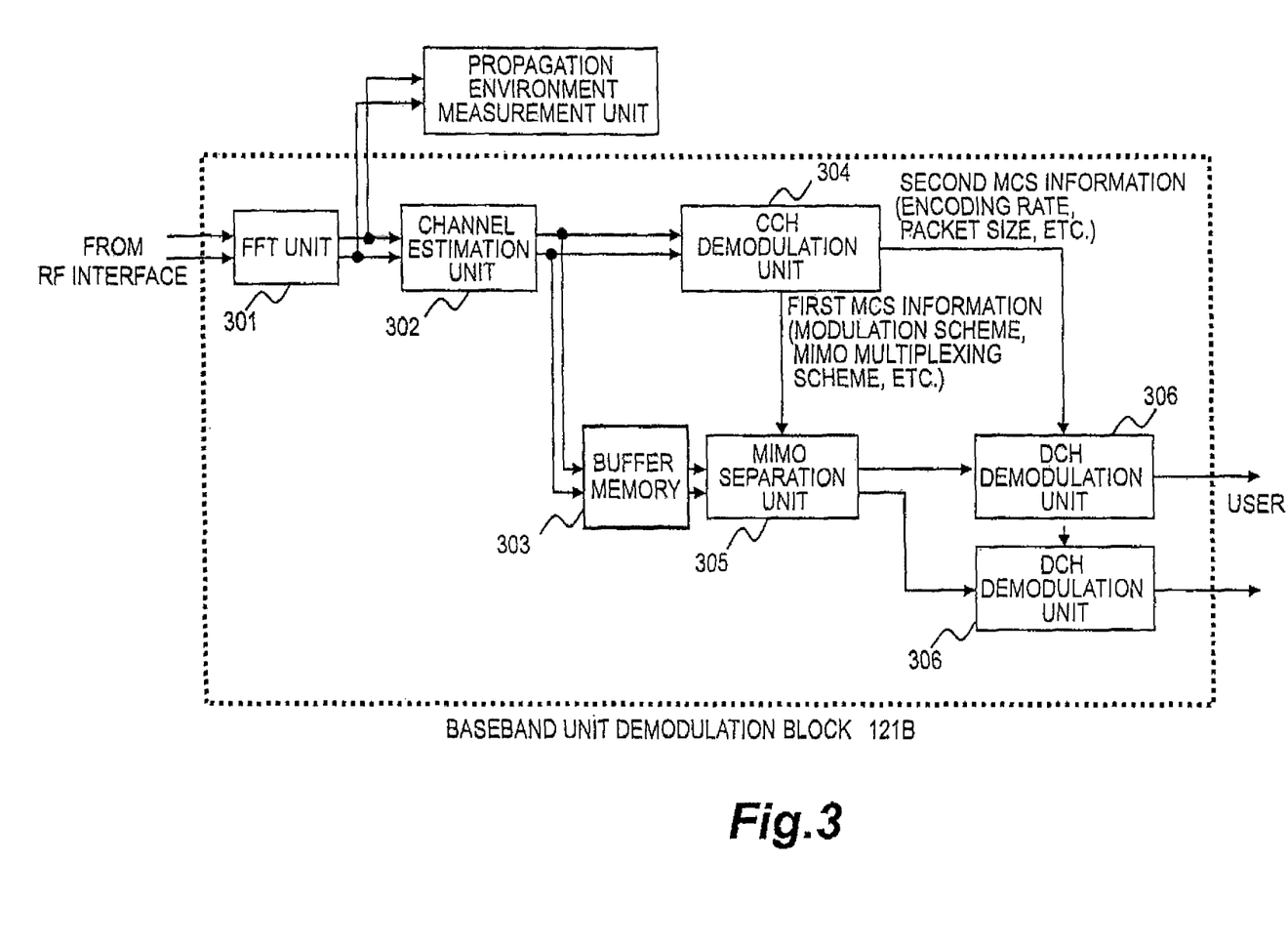
FIG. 3 is a block diagram illustrating a configuration of the baseband unit demodulation block of the terminal apparatus in the MIMO-OFDM system in accordance with the embodiment of this invention.

FIG. 3 is a block diagram illustrating a configuration of the baseband unit demodulation block 121B of the terminal apparatus in the MIMO-OFDM system of the embodiment of this invention. The baseband unit demodulation block 121A of the base station has a similar configuration. FIG. 3 illustrates components such as a component for MIMO stream separation not shown in FIG. 2. Thus, the illustrated configuration is partially different from that of the demodulation block 121B shown in FIG. 2.

Orthogonal frequency division multiple access (OFDMA) refers to an orthogonal frequency division multiple connection, which is a method for dividing data series into a plurality of carriers to transmit them in parallel. This invention is not limited to the MIMO-OFDM system, but can be applied to a system using a multiple access method other than the OFDMA to which the MIMO multiplexing is introduced.

The baseband unit demodulation block 121B receives data from the RF interface 113. In the case of the OFDMA, a finite Fourier transform (FFT) unit 301 executes discrete Fourier transform to convert the data into a signal of a frequency area. A channel estimation unit 302 estimates a channel that has used a pilot signal, and separates a control signal and a data signal from each other in synchronization with timing of the estimated channel. Received data of a data channel is first stored in a buffer memory 303. While processing of the data channel is in a standby status, a CCH demodulation unit 304 demodulates a control channel to extract first MCS information containing information on a modulation scheme or a MIMO multiplexing scheme and second MCS information containing information on a packet size or an encoding rate.

A MIMO separation unit 305 receives the first MCS information containing a modulation scheme from the CCH demodulation unit 304. A cycle of timing of receiving the first MCS information and update timing of the first MCS information will be described later. The MIMO separation unit 305 separates a MIMO stream in parallel with processing of the CCH demodulation unit 304. A DCH demodulation unit 306 decodes each stream (data series) after the MIMO stream separation based on the second MCS information containing packet information of data input from the CCH demodulation unit 304.

The MIMO stream separation performed by the MIMO separation unit 305 will be described.

In the MIMO multiplexing, signals simultaneously transmitted from a plurality of transmitter antennas are input through a plurality of propagation paths to a plurality of receiver antennas. A signal received by one receiver antenna is accordingly a result of multiplexing signals changed based on transmission characteristics of propagation paths. Thus, the receiver side has to separate MIMO-multiplexed signals to take out the original independent signal. Of several MIMO stream separation methods available, maximum likelihood detection (MLD) is known to be most excellent in performance. A MIMO stream separation process based on a MLD system will be described below as an example of the signal separation method.

Figure 4:
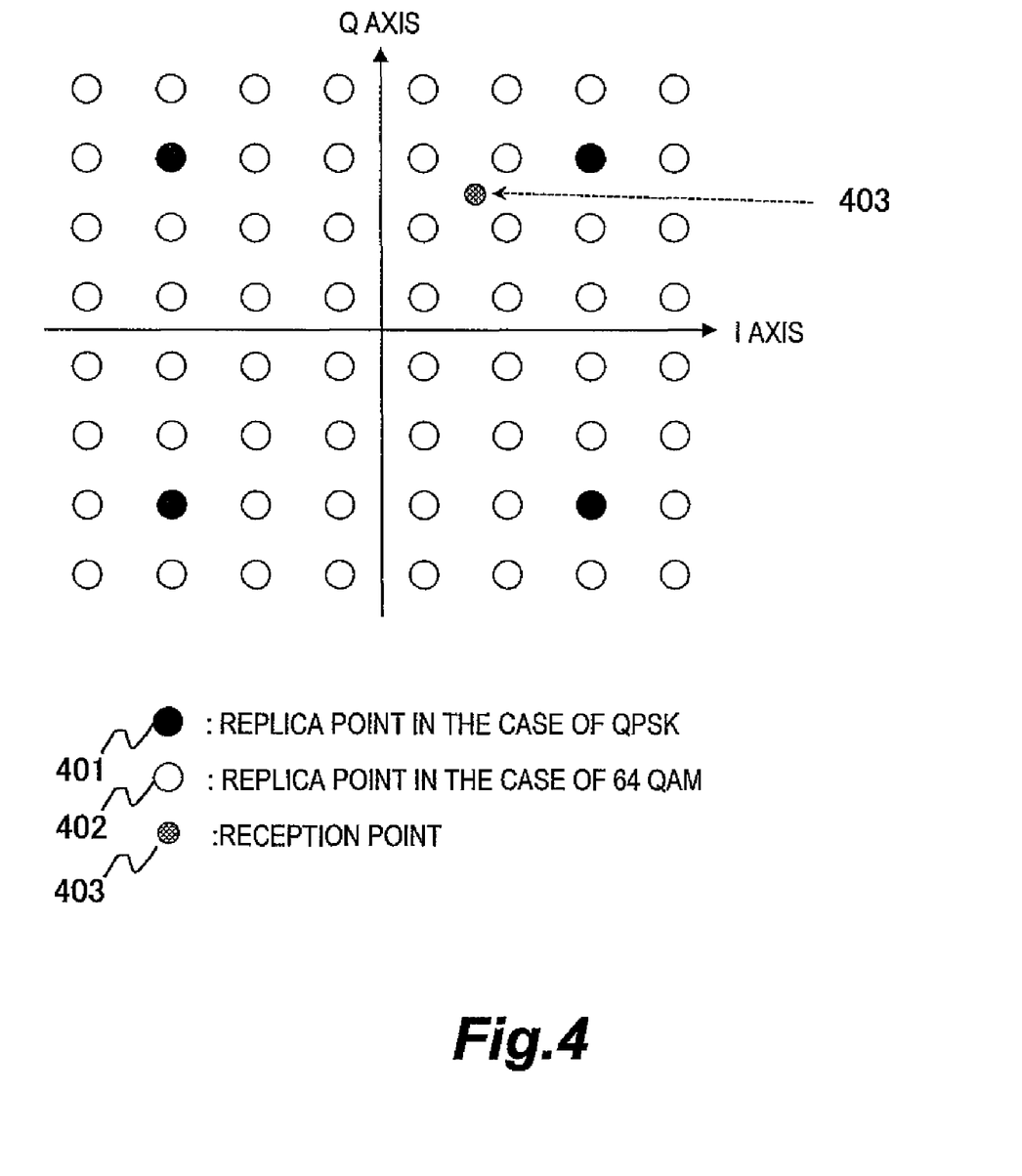
FIG. 4 is an explanatory diagram illustrating an IQ constellation for modulation scheme estimation by the MLD system in accordance with the embodiment of this invention.

FIG. 4 illustrates an IQ constellation for modulation scheme estimation by the MLD system according to the embodiment of this invention.

In the MLD system, replicas of all signal points likely to be transmitted on an IQ axis are generated. The generated replica points are compared with the received signal points to output a highest likelihood point as an estimation result. For example, in the case of transmission by a quadrature phase shift keying (QPSK) modulation scheme, there are four signal points 401 likely to be transmitted, and a replica point closest to a signal point 403 actually received is output as a highest likelihood signal. In the case of transmission by a 64 quadrature amplitude modulation (QAM) system, highest likelihood one of replica points 402 of 64 signal points likely to be transmitted becomes an estimation result. Thus, since replica points that become comparison targets vary from one modulation scheme to another, which of the modulation schemes is used for signals has to be identified in the MIMO stream separation process. As a result, the modulation scheme is information necessary before the MIMO stream separation, and contained in the first MCS information.

Examples of the first MCS information necessary for the MIMO stream separation process are, in addition to the modulation scheme, pieces of information regarding presence of MIMO multiplexing execution, a method of MIMO multiplexing (e.g., ID of precoding codebook, or a distinction between a single code word and a multi code word), and presence of space time transmit diversity (STTD). Examples of the second MCS information are a packet size and an encoding rate.

Next, an operation performed by the receiver side demodulation block 121B to carry out MIMO processing of a data channel simultaneously with control channel demodulation based on the first MCS information and the second MCS information will be described.

Figure 5:
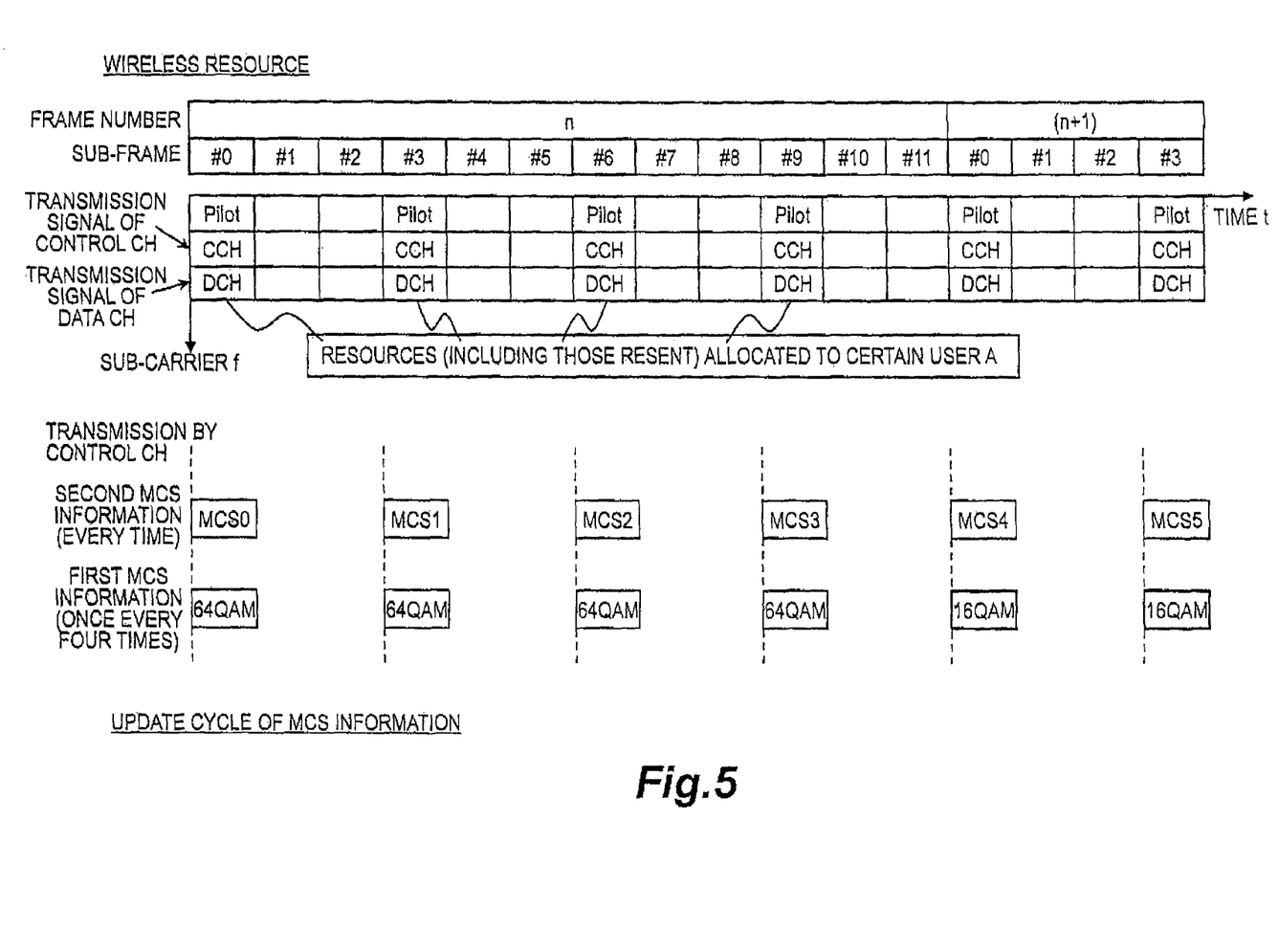
FIG. 5 is an explanatory diagram illustrating a cycle of update timing of the MCS information in accordance with the embodiment of this invention.

FIG. 5 illustrates a cycle of update timing of the MCS information according to the embodiment of this invention, specifically a case where a cycle of update timing of the first MCS information is longer than that of update timing of the second MCS information.

In the OFDMA system, sub-carriers are allocated to users, and user and data to be allocated to the sub-carriers are changed at regular time intervals. For example, FIG. 5 illustrates a case where wireless resources divided into 36 per frame (3 sub-carriers (frequencies)×12 sub-frames (time)) are allocated four times for every three sub-frames to three users A to C. The user A can use resources of #0, #3, #6, and #9. Three different sub-carriers can all be used for the sub-frames. Thus, a pilot signal, a control channel (CCH), and a data channel (DCH) are allocated to each of the sub-frames, and data is transmitted through the allocated sub-frame.

FIG. 5 illustrates transmission timing and contents of the MCS information transmitted through the control channel (CCH). In the embodiment, a changing cycle of the first MCS information is longer than that of the second MCS information. In FIG. 5, the first MCS information is updated once every four times (every four allocated sub-frames) while the second MCS information is updated every time.

Accordingly, since the first MCS information extracted from the sub-frame #0 can continuously be used in the same frame, CCH demodulation of the sub-frames #3, #6, and #9 becomes simple processing of demodulating only the second MCS information and extracting the demodulated data. Thus, unless the first MCS information is not updated, the MIMO stream separation process based on the first MCS information and the DCH demodulation processing based on the second MCS information can simultaneously be carried out, providing an effect of reducing a capacity of the buffer memory while curbing a delay in processing the data channel.

The effect of reducing the data channel processing delay is larger as a difference in cycles of update timing between the first MCS information and the second MCS information is larger. However, the larger difference in cycles of update timing disables real-time changing of the modulation scheme, lowering responsiveness of adaptive modulation. In other words, a modulation scheme optimal to a propagation environment cannot be selected, reducing transmission performance of the wireless system.

Thus, there is a trade-off relationship between the data channel processing performance and the transmission performance, necessitating an arrangement to eliminate the trade-off relationship. The arrangement to eliminate the trade-off relationship will be described later.

In the example of FIG. 5, the timing of updating the first MCS information is fixed at the time of the sub-frame number #0. The update timing may be timing when a sub-frame number becomes a predetermined value, timing when a boundary of an upper frame of the sub-frames appears, or timing when a residue (Modulo N) of the sub-frame number satisfies predetermined conditions.

Fixing the update timing of the first MCS information enables the terminal apparatus side to judge whether to wait for CCH demodulation processing to obtain first MCS information at present, or whether to go ahead with a MIMO stream separation process without waiting.

Figure 6:
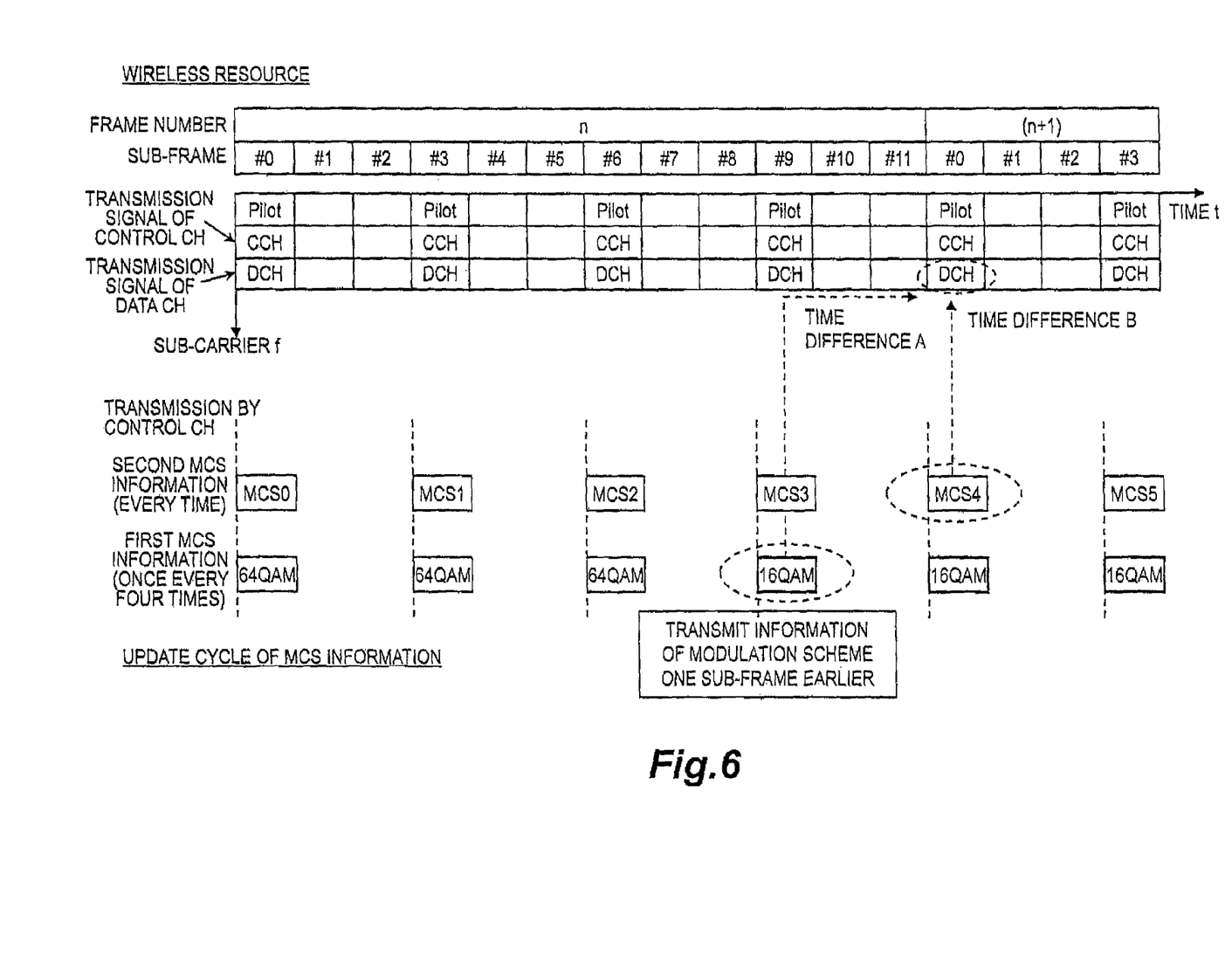
FIG. 6 is an explanatory diagram illustrating transmission timing of MCS information in accordance with a modified example of the embodiment of this invention.

FIG. 6 illustrates transmission timing of MCS information according to a modified example of the embodiment of this invention, specifically a case where transmission timing of the first MCS information is earlier than that of a DCH modulated according to the first MCS information.

In the example of FIG. 5, the DCH demodulation processing of the sub-frame #0 has to wait for demodulation of the first MCS information contained in the CCH of the same sub-frame #0. The time necessary for the MIMO stream separation process dependent on the first MCS information is accompanied by a data channel delay.

In the update timing example of the MCS information illustrated in FIG. 6, the first MCS information to be used by the data channel of the head sub-frame #0 of the frame (n+1) is transmitted through the last sub-frame #9 allocated in the preceding frame n. In other words, transmitting the first MCS information through the preceding sub-frame ahead of the data channel modulated according to the first MCS information enables the receiver side to start the MIMO stream separation process simultaneously with the data channel reception without waiting for extraction of the first MCS information.

With this configuration, there is provided an effect of reducing data channel processing delays in all the sub-frames of the next frame (n+1).

On the other hand, however, in the adaptive modulation control unit on the transmitter side, when a difference between a timing at which first MCS information is determined and transmitted through a control channel, and a timing at which a data channel modulated according to the first MCS information is transmitted is enlarged, a modulation scheme optimal to a propagation environment cannot be selected in this period, lowering responsiveness of adaptive modulation. In other words, there is a trade-off relationship between DCH channel processing performance and system transmission performance.

There is a similar trade-off relationship in the case where a difference between a timing at which the adaptive modulation control unit on the transmitter side determines second MCS information and transmits the information through the control channel, and a timing at which a data channel modulated according to the second MCS information is transmitted becomes large. In the example of FIG. 6, a time difference A which is a difference between a timing of determining the first MCS information to transmit the information through the control channel and a timing of transmitting a data channel modulated according to the first MCS information is set longer than a time difference B which is a difference between a timing of determining the second MCS information to transmit the information through a control channel and a timing of transmitting a data channel modulated according to the second MCS information. In other words, the transmission timing of the first MCS information is set to give priority to reduction of a processing delay regarding the MIMO stream separation process. On the other hand, the transmission timing of the second MCS information is set to give priority to performance of adaptive modulation.

As illustrated in FIGS. 5 and 6, the update timing cycle of the first MCS information necessary for the MIMO stream separation process is set long and the transmission timing of the first MCS information and the transmission timing of the data channel based on the MCS information are deviated from each other, thereby reducing a processing delay of the data channel. As described above, however, this configuration leads to a problem of a reduction in adaptive modulation performance of the system. A method for preventing a reduction in transmission performance by combining the first MCS information containing information on a modulation scheme with the second MCS information containing an encoding rate to supplement each other, thereby eliminating the trade-off relationship, will be described.

Figure 7A:
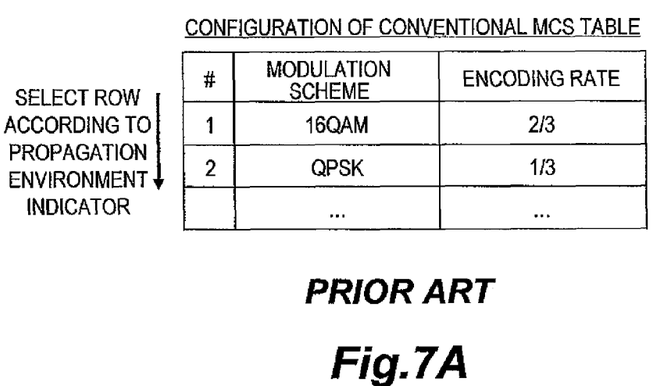
FIG. 7A is an explanatory diagram illustrating a configuration of the conventional MCS table.
Figure 7B:
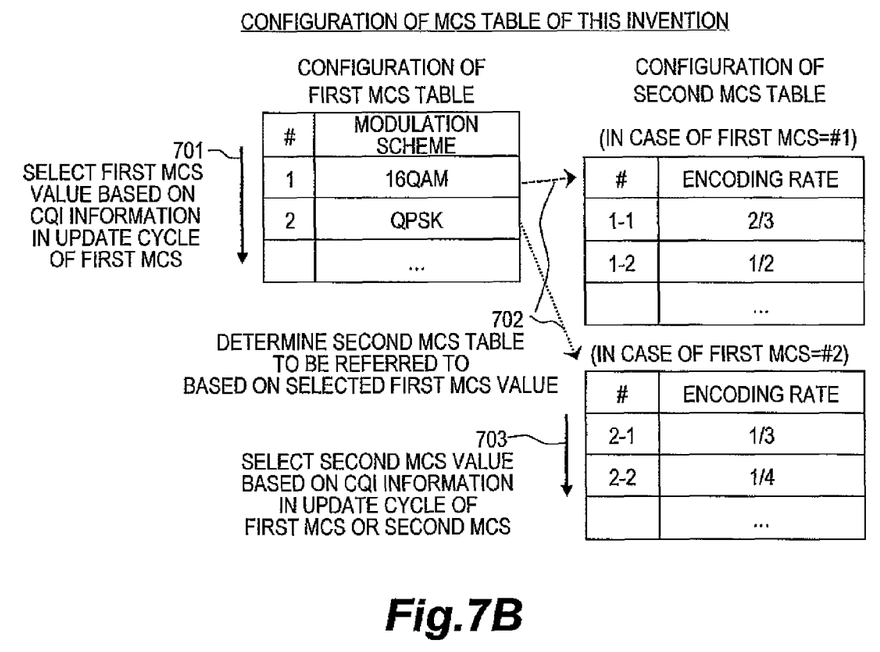
FIG. 7B is an explanatory diagram illustrating a configuration of an MCS table in accordance with the embodiment of this invention.

FIG. 7B illustrates a configuration of an MCS table according to the embodiment of this invention.

Conventionally, as illustrated in FIG. 7A, one MCS table has been prepared, and a modulation scheme and an encoding rate have been associated with each other beforehand based on predetermined combinations. Thus, for example, when an entry #2 of the MCS table is selected according to certain CQI information (value of propagation environment indicator), a fixed set of a modulation scheme "QPSK" and an encoding rate "1/3" is used.

This table structure inhibits setting of an update timing cycle of first MCS information (modulation scheme) and an update timing cycle of second MCS information (encoding rate) to be different from each other unlike the case illustrated in FIG. 5 or 6. The table structure also inhibits changing of only a second MCS value (encoding rate) without changing a first MCS value (modulation scheme). Thus, in the embodiment, the structure of the MCS table is changed to be divided into a first MCS table describing selections of the first MCS information (modulation scheme) and a second MCS table describing selections of the second MCS information (encoding rate). The second MCS table includes a plurality of tables corresponding to values selected from the first MCS table.

As a result, a plurality of encoding rates can be associated with one modulation scheme, and an update timing cycle of the first MCS information can be set longer than that of the second MCS information.

Figure 8:
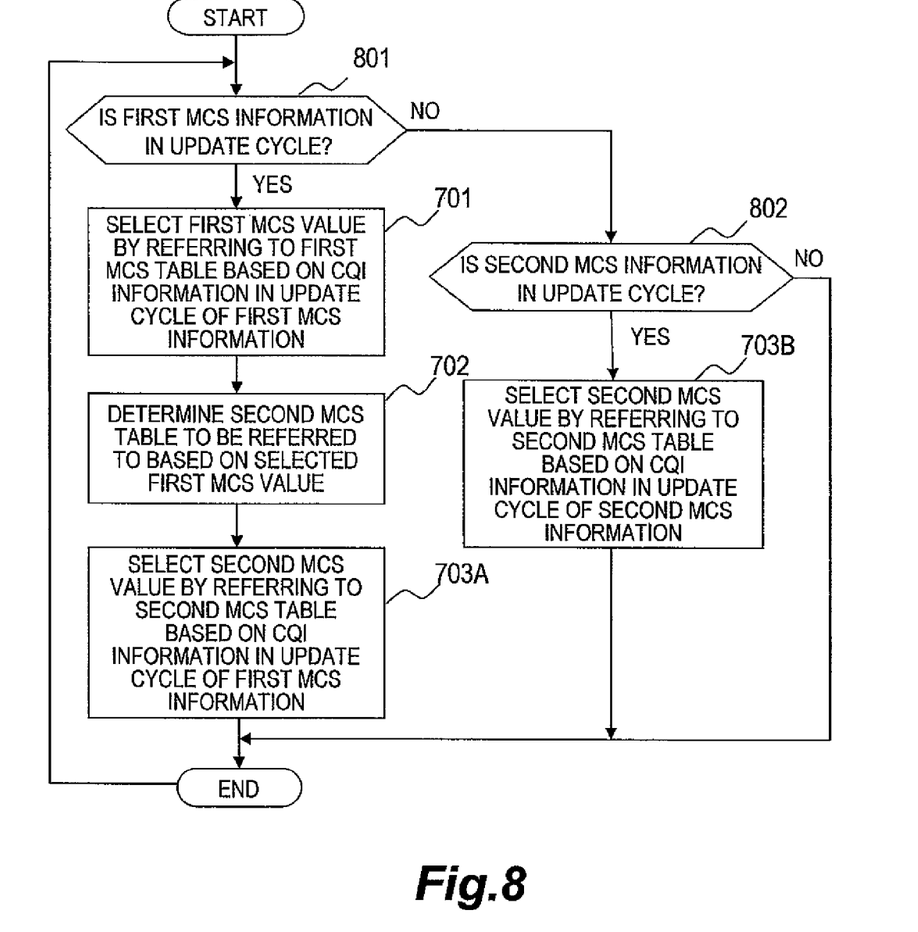
FIG. 8 is a flowchart illustrating processing of determining a first MCS value (modulation scheme) and a second MCS value (encoding rate) in accordance with the embodiment of this invention.

FIG. 8 is a flowchart illustrating processing of determining a first MCS value (modulation scheme) and a second MCS value (encoding rate) according to the embodiment of this invention. Referring to FIG. 8, processing of determining a combination of a first MCS value and a second MCS value will be described in association with the MCS table illustrated in FIGS. 7A and 7B.

In Step 801, the adaptive control unit 201 of the base station (or of the terminal apparatus) judges whether the first MCS information is at the predetermined update timing. Whether the first MCS information at an update timing can be judged based on whether a sub-frame number satisfies the predetermined conditions as described above.

When the first MCS information is at the update timing, in Step 701, the adaptive control unit 201 refers to the first MCS table to select an optimal first MCS value (16 QAM or QPSK) based on the CQI information received through the control channel at the timing. In Step 702, the adaptive control unit 201 determines, based on the selected first MCS value, a second MCS table to be referred to among a plurality of second MCS tables prepared. For example, when an entry #1 is selected from the first MCS table of FIG. 7B, the adaptive control unit 201 decides on a second MCS table corresponding to the modulation scheme "16 QAM", and when an entry #2 is selected, the adaptive control unit 201 decides on a second MCS table corresponding to the modulation scheme "QPSK".

Having decided on the second MCS table to be referred to, in Step 703A, the adaptive control unit 201 selects a second MCS value based on CQI information obtained at the update timing of the first MCS information.

On the other hand, when it is judged in Step 801 that the first MCS information is not at the update timing, in Step 802, the adaptive control unit 201 judges whether the second MCS information is at the update timing. Whether the second MCS information is at the update timing may be judged based on whether a transmission timing of each allocated sub-frame is the update timing of the second MCS information or whether a sub-frame number satisfies the predetermined conditions.

When the result shows that the second MCS information is at the update timing, in Step 703B, the adaptive control unit 201 selects a second MCS value from a currently selected entry of the second MCS table by using CQI information obtained at the update timing of the second MCS information.

According to the embodiment, a certain modulation scheme can be appropriately combined with a certain encoding rate with respect to certain CQI information (propagation environment indicator value). Thus, since an encoding rate supplemental to a modulation scheme selected at the time can be selected, a reduction in responsiveness of adaptive modulation can be minimized even if an update timing cycle of the modulation scheme is set longer (update frequency is reduced).

Depending on a wireless propagation environment, a CQI value (propagation environment indicator value) may considerably be reduced. Thus, setting may be employed such that the adaptive control unit can select only a specific modulation scheme with respect to such a CQI value.

While the present invention has been described in detail and pictorially in the accompanying drawings, the present invention is not limited to such detail but covers various obvious modifications and equivalent arrangements, which fall within the purview of the appended claims.

What is claimed is:

1. A wireless communication system, comprising:
a wireless communication apparatus which performs adaptive modulation for changing a modulation method and an encoding rate utilized for data of a data channel, by using the data channel and a control channel for transmitting control information to be applied to the data channel, and where the wireless communication apparatus transmits/receives a signal via MIMO multiplexing, wherein:
the control information includes first control information to be used for a MIMO stream separation process and second control information to be used for a process other than the MIMO stream separation process;
the wireless communication apparatus holds a first control information table describing selections of the first control information and a second control information table describing selections of the second control information;
the selections in the second control information table are changed to correspond to first control information selected in the first control information table; and
the wireless communication apparatus is configured to:
determine the first control information, at an update timing set for the first control information, by referring to the first control information table;
determine candidate selections of the second control information based on the determined first control information; and
select one of the candidate selections of the second control information, at an update timing set for the second control information.

2. The wireless communication system according to claim 1, wherein:
the first control information includes information of the modulation method utilized for the data of the data channel; and
the second control information includes information of the encoding rate utilized for data of the data channel.

3. The wireless communication system according to claim 1, wherein a length of a cycle set for the update timing of the first control information, is longer in length than a length of a cycle set for the update timing of the second control information.

4. The wireless communication system according to claim 1,
wherein the wireless communication apparatus comprises:
a control channel demodulation unit which demodulates a signal of the control channel;
a MIMO separation unit which performs a MIMO stream separation process for the data channel; and
a plurality of data channel demodulation units which demodulate the data channel after the MIMO stream separation, and
wherein the control channel demodulation unit sends the first control information to the MIMO separation unit, and the second control information to the data channel demodulation units.

5. The wireless communication system according to claim 1,
wherein the wireless communication apparatus determines the first control information and the second control information, and transmits the determined first control information and the determined second control information to a wireless communication apparatus of a corresponding node through the control channel; and wherein a difference between a transmission timing of the determined first control information and a transmission timing of a data channel to which the determined first control information is applied, is longer than a difference between a transmission timing of the determined second control information and a transmission timing of a data channel to which the determined second control information is applied.

6. A wireless communication apparatus included in a wireless communication system, the wireless communication apparatus comprising an adaptive modulation for changing a modulation method and an encoding rate utilized for data of a data channel, by using the data channel and a control channel for transmitting control information applied to the data channel the wireless communication apparatus transmitting/receiving a signal via MIMO multiplexing, wherein:

the control information includes first control information to be used for a MIMO stream separation process and second control information to be used for a process other than the MIMO stream separation process;

the wireless communication apparatus holds a first control information table describing selections of the first control information and a second control information table describing selections of the second control information;

the selections in the second control information table are changed to correspond to first control information selected in the first control information table; and the wireless communication apparatus is configured to:
  determine the first control information, at an update timing set for the first control information, by referring to the first control information table;
  determine candidate selections of the second control information based on the determined first control information; and
  select one of the candidate selections of the second control information, at an update timing set for the second control information.

7. The wireless communication apparatus according to claim 6, wherein:
  the first control information includes information of the modulation method utilized for the data of the data channel; and
  the second control information includes information of the encoding utilized for the data of the data channel.

8. The wireless communication apparatus according to claim 6, wherein a length of a cycle set for the update timing of the first control information, is longer in length than a length of a cycle set for the update timing of the second control information.

9. The wireless communication apparatus according to claim 6, comprising:
  a control channel demodulation unit which demodulates a signal of the control channel;
  a MIMO separation unit which performs a MIMO stream separation process for the data channel; and
  a plurality of data channel demodulation units which demodulate the data channel after the MIMO stream separation,
  wherein the control channel demodulation unit sends the first control information to the MIMO separation unit, and the second control information to the data channel demodulation units.

10. The wireless communication apparatus according to claim 6, wherein the wireless communication apparatus determines the first control information and the second control information, and transmits the determined first control information and the determined second control information to a wireless communication apparatus of a corresponding node through the control channel; and wherein a difference between a transmission timing of the determined first control information and a transmission timing of a data channel to which the determined first control information is applied, is longer than a difference between a transmission timing of the determined second control information and a transmission timing of a data channel to which the determined second control information is applied.

11. A wireless communication method applied to a wireless communication system, the wireless communication system having a wireless communication apparatus which performs adaptive modulation for changing a modulation method and an encoding rate utilized for data of a data channel, by using the data channel and a control channel for transmitting control information to be applied to the data channel, and where the wireless communication system transmits/receives a signal via MIMO multiplexing, wherein:

the control information comprises first control information to be used for a MIMO stream separation process and second control information to be used for a process other than the MIMO stream separation process;

the wireless communication apparatus holds a first control information table describing selections of the first control information and a second control information table describing selections of the second control information;

the selections in the second control information table are changed to correspond to first control information selected in the first control information table, the method including the steps of:
determining, by the wireless communication apparatus, the first control information at an update timing set for the first control information, by referring to the first control information table;
determining, by the wireless communication apparatus, candidate selections of second control information based on the determined first control information; and
selecting, by the wireless communication apparatus, one of the candidate selections of the second control information, at an update timing set for the second control information.

12. The wireless communication method according to claim 11, wherein:
  the first control information includes information of the modulation method utilized for the data of the data channel; and
  the second control information includes information of the encoding rate utilized for the data of the data channel.

13. The wireless communication method according to claim 11, wherein a length of a cycle set for the update timing of the first control information, is longer in length than a length of a cycle set for the update timing of the second control information.

14. The wireless communication method according to claim 11,
  wherein the method including the step of determining, by the wireless communication apparatus, the first control information and the second control information, and transmits the determined first control information and the determined second control information to a wireless communication apparatus of a corresponding node through the control channel; and wherein a difference between a transmission timing of the determined first control information and a transmission timing of a data channel to which the determined first control information is applied, is longer than a difference between a transmission timing of the determined second control information and a transmission timing of a data channel to which the determined second control information is applied.

* * * * *